3,149,152
MONO-ALKALI METAL BISULFITES OF DIALDEHYDES

Werner Richard Boehme, Somerville, N.J., assignor to Ethicon, Inc., a corporation of New Jersey
No Drawing. Filed Jan. 3, 1961, Ser. No. 80,000
4 Claims. (Cl. 260—513)

This invention relates to a new series of organic compounds and to methods for their preparation.

In the co-pending application of Rollin E. Pepper and Emanuel R. Lieberman, Serial No. 843,297 filed September 29, 1959, forfeited in favor of continuation-in-part application Serial No. 79,966, filed January 3, 1961, now patent No. 3,016,328, there are disclosed compositions comprising, as their principal constituents, a saturated dialdehyde containing from 2 to 6 carbon atoms, isopropyl alcohol and an alkalinating agent. These compositions are sporicidally active and have found wide application as cold sterilizing agents in the medical and surgical fields.

The saturated dialdehydes which are useful in the preparation of the composition of the above-mentioned patent application are the n-alkane-alpha-omega-dicarboxaldehydes containing from 2 to 6 carbon atoms. Among such dialdehydes may be included malonaldehyde, succinaldehyde, gultaraldehyde, adipaldehyde and oxaldehyde.

The sporicidal activity in the above-mentioned compositions stems from the unique combination of dialdehyde, isopropyl alcohol and alkalinating agent. It is essential to have, in addition to the dialdehyde, a sufficient degree of alkalinating in an isopropyl alcohol environment in order to obtain a maximal sporicidal effect.

Although the sporicidal composition of Pepper and Lieberman is extremely useful, one of its disadvantages, not reflecting upon its sporicidal attributes, is the fact that the free dialdehyde components are difficult to handle because of their liquid forms. As a result, it is quite troublesome to prepare the compositions with free dialdehydes due to handling and stability problems.

It has now been discovered that the free dialdehydes may be converted into forms which are much more stable than the parent dialdehydes and have sporicidal activity equal to that of the parent from which they are derived. The conversion products which have been discovered are mono-adducts of the dialdehydes which may be conveniently represented by the following general formula:

wherein Y stands for CHO or R—CHO, R being a straight or branched chain alkylene group from 1 to 6 carbon atoms and X is a residue of an inorganic sulfur acid such as, for example, a sulfonate, sulfoxylate or thiosulfate moiety. X may be in the form of the free anion or in the form of its alkali metal derivative, that is to say, in the form of a salt of a metal belonging to group I or II of the periodic table, such as sodium, potassium or zinc. The di-adducts of the dialdehydes, in which both aldehyde groups are allowed to react with the above-mentioned inorganic sulfur acid salt, have no sporicidal activity in an alkalinized isopropyl alcohol medium.

It is known that adducts of dialdehydes may be obtained from the aqueous solutions of the dialdehyde and the appropriate acid salt, as for example an alkali metal bisulfite, by evaporation or by precipitation with, for example, alcohol. For example, a solution of sodium bisulfite and glutaraldehyde in equal molar proportions may be evaporated to obtain a one-half quantity of glutaraldehyde in the distillate and a solid residue consisting primarily of the gultaraldehyde bis-sodium bisulfite adduct. When an aqueous solution of sodium bisulfite and gultaraldehyde or glyoxal in equimolar proportions is treated with alcohol the crystalline solid precipitated is the dialdehyde di-sodium bis-bisulfite adduct.

The present application is based upon the discovery that if a dialdehyde is rapidly evaporated, as for example by spray drying, in the presence of an inorganic sulfur acid salt, the rapid evaporation freezes the equilibrium and a solid product consisting primarily of an aldehyde mono-adduct is obtained. The disproportionation reaction is thus minimized and little free aldehyde is lost by co-distillation with water.

If it is desired to obtain the monobisulfite adduct of the dialdehyde, the most convenient means for doing so is to employ the syray-drying procedure. However, in the case of other adducts, as for example when a metal salt of hyposulfurous acid is employed, such adducts may be obtained by an aldehyde interchange reaction or by chemical reduction of the monobisulfite salt. Further, the monoadducts of the present invention may also be prepared by addition of a dithionite salt to an alkaline solution of an aldehyde.

The molar ratio of the dialdehyde to the alkali metal acid salt may range from about 1 to 2, preferably in a ratio from 1 to 1.2. Improved results have been obtained when an alkali metal carbonate or bicarbonate in a concentration of up to 50% of the dialdehyde is added to the solution prior to the spray-drying procedure.

The spray drying may be conducted by any suitable spray-drying means, for example in a conical spray drier at an inlet temperature of 300° F. and an outlet air temperature of 200° F. The inlet temperature may vary from 200° F. to about 300° F., preferably from 250° F. to 275° F. The outlet temperature may vary from 150° F. to 250° F., preferably from 175° F. to 200° F.

In conducting the spray-drying operation the dialdehyde is conveniently reacted in the form of an aqueous solution in a concentration of from about 20% to 35%, the exact volume depending upon the particular conditions and molar ratios reacted.

The following examples are intended to illustrate, but not to limit, the scope of the present invention.

Example I

A quantity of 488 parts by weight of potassium metabisulfite is dissolved in 2,012 parts by volume of a 25% aqueous solution of glutaraldehyde. The solution is spray dried at an inlet air temperature of 250° F. and an outlet temperature of 180° F. The product, potassium glutaraldehyde monobisulfite, is obtained as a colorless free-flowing powder. Carbonyl assay shows the material to be 97.5% pure.

Example II 104 parts by weight of sodium bisulfite is dissolved in 400 parts by volume of a 31% solution of 3-methylglutaraldehyde and spray dried as in Example I. Sodium 3-methylglutaraldehyde monobisulfite is obtained as a colorless powder.

Example III 111 parts by weight of potassium metabisulfite is dissolved in 193 parts by weight of a 30% aqueous solution of glyoxal (oxaldehyde). The solution is spray dried as in Example I to obtain potassium glyoxal monobisulfite.

Example IV 1000 parts by volume of a 25% aqueous glutaraldehyde solution is stirred with 308 parts by weight of 97% potassium metabisulfite. Acetic acid (11.9 parts by volume) is added to the resulting solution of potassium glutaraldehyde bis-bisulfite. The reduction is carried out by adding 4 parts by weight of 94% zinc dust in small portions at 60° C. Stirring is continued for fifteen minutes longer and the suspended zinc and zinc oxide is filtered. 1000 parts by volume of 25% aqueous glutaraldehyde is then added. The product is equivalent to a glutaraldehyde monobisulfite salt of which 0.5% has been reduced to glutaraldehyde monosulfoxylate.

*Example V*

A monobisulfite solution containing 5% of the sulfoxylate is prepared by the procedure described in Example IV, employing 119 parts by volume of acetic acid and 40 parts by weight of 94% zinc dust.

What is claimed is:
1. A mono-alkali metal bisulfite of an alkane dialdehyde having from 2 to 8 carbon atoms.
2. Mono-potassium bisulfite of glutaraldehyde.
3. Mono-sodium bisulfite of 3-methylglutaraldehyde.
4. Mono-potassium bisulfite of glyoxal.

References Cited in the file of this patent
UNITED STATES PATENTS

| | | |
|---|---|---|
| 2,857,427 | Boehme et al. | Oct. 21, 1958 |
| 2,880,236 | Mehltretter et al. | Mar. 31, 1959 |

FOREIGN PATENTS

| | | |
|---|---|---|
| 542,446 | Canada | June 18, 1957 |

OTHER REFERENCES

Rodd: "Chemistry of Carbon Compounds," vol., IA, 1951, pages 486–487.